United States Patent

Miyazaki et al.

(10) Patent No.: US 8,344,284 B2
(45) Date of Patent: Jan. 1, 2013

(54) LASER MACHINING NOZZLE

(75) Inventors: Takanori Miyazaki, Chiyoda-ku (JP);
Masaru Kanaoka, Chiyoda-ku (JP);
Taira Ogita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 384 days.

(21) Appl. No.: 12/665,544

(22) PCT Filed: Jul. 23, 2008

(86) PCT No.: PCT/JP2008/063163
§ 371 (c)(1),
(2), (4) Date: Mar. 5, 2010

(87) PCT Pub. No.: WO2009/019976
PCT Pub. Date: Feb. 12, 2009

(65) Prior Publication Data
US 2010/0187209 A1    Jul. 29, 2010

(30) Foreign Application Priority Data
Aug. 3, 2007   (JP) .................................. 2007-203026

(51) Int. Cl.
*B23K 26/14* (2006.01)
*B23K 26/38* (2006.01)
(52) U.S. Cl. ............................. 219/121.67; 219/121.84
(58) Field of Classification Search ............. 219/121.61, 219/121.63–121.72, 121.84
See application file for complete search history.

(56) References Cited

U.S. PATENT DOCUMENTS

| 4,011,521 | A | * | 3/1977 | Kantrowitz et al. | 372/90 |
| 4,100,507 | A | * | 7/1978 | Born et al. | 372/90 |
| 5,292,418 | A | * | 3/1994 | Morita et al. | 204/224 R |
| 5,628,924 | A | * | 5/1997 | Yoshimitsu et al. | 219/121.5 |
| 6,770,840 | B2 | * | 8/2004 | Minamida et al. | 219/121.64 |

FOREIGN PATENT DOCUMENTS

| CN | 1781611 A | | 6/2006 |
| JP | 03-151186 A | | 6/1991 |
| JP | 04-084687 A | | 3/1992 |
| JP | 06190582 A | * | 7/1994 |
| JP | 6-229888 A | | 8/1994 |
| JP | 7290268 | * | 11/1995 |
| JP | 10-249572 A | | 9/1998 |
| JP | 2000-107879 A | | 4/2000 |
| JP | 2006-341368 A | | 12/2006 |

OTHER PUBLICATIONS

Office Action issued Apr. 26, 2012 in Chinese Patent Application No. 200880101743.0.

* cited by examiner

*Primary Examiner* — Samuel M Heinrich
(74) *Attorney, Agent, or Firm* — Sughrue Mion, PLLC

(57) ABSTRACT

A laser machining nozzle herein obtained includes a main assist-gas nozzle (2) for emitting a laser beam (8) and a main assist-gas, and an auxiliary assist-gas nozzle (5) annularly surrounding the main assist-gas nozzle for emitting an auxiliary assist-gas, whereby a gold plating (12) is provided on an interior surface of the main assist-gas nozzle to reflect the laser beam, so that a temperature rise of the laser machining nozzle can be prevented, and even when the laser beam (8) is reflected on the interior surface of the laser machining nozzle, it is possible to reduce peeling of the gold plating (12) applied onto the interior surface of the laser machining nozzle.

9 Claims, 2 Drawing Sheets

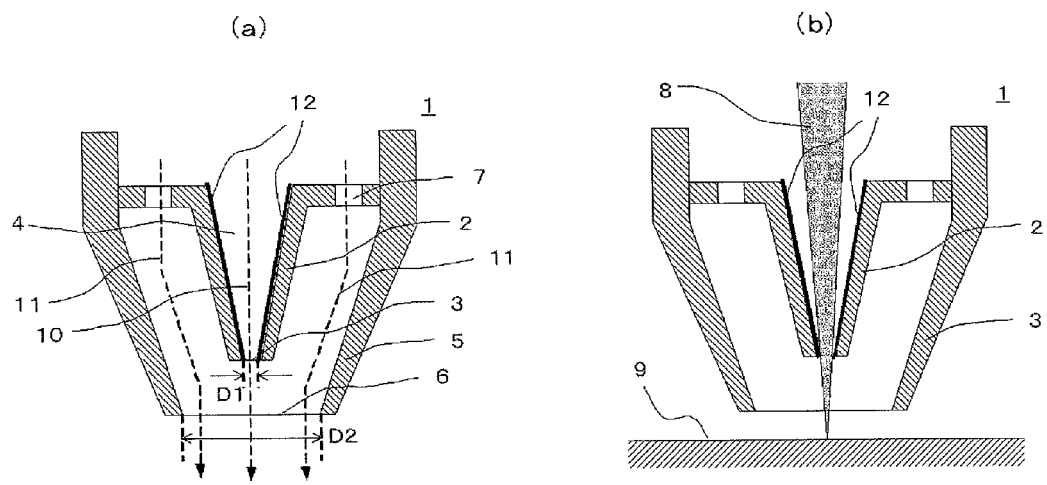
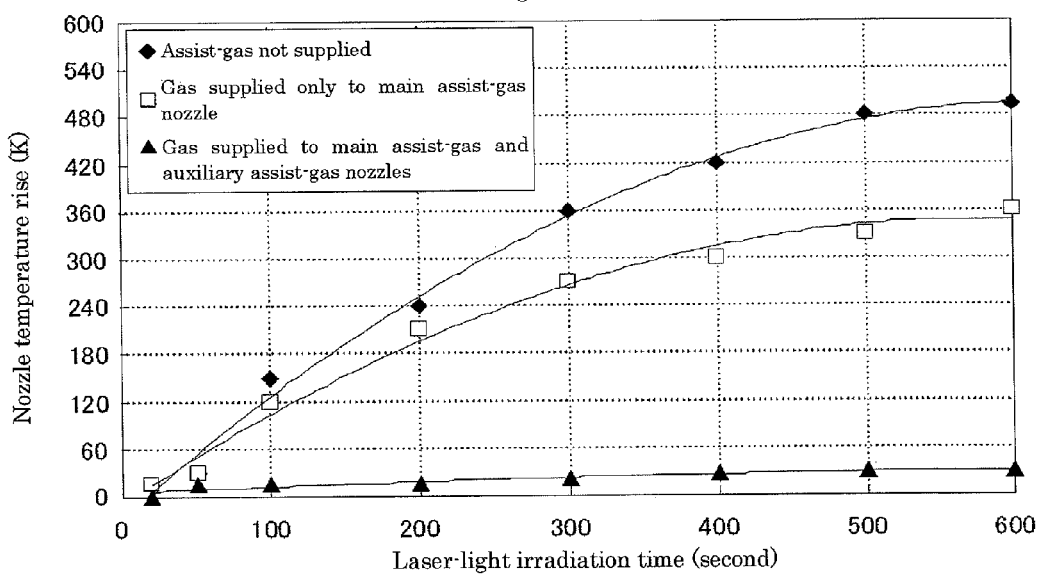

LASER MACHINING NOZZLE

CROSS REFERENCE TO RELATED APPLICATIONS

This application is a National Stage of International Application No. PCT/JP2008/063163 filed Jul. 23, 2008, claiming priority based on Japanese Patent-Application No. 2007-203026, filed Aug. 3, 2007, the contents of all of which are incorporated herein by reference in their entirety.

TECHNICAL FIELD

The present invention relates to a laser machining nozzle included in a laser machining apparatus for emitting a laser beam.

BACKGROUND ART

Cutting capabilities in laser machining are governed by operation conditions such as an output of a laser beam, the focusing position of the laser beam with respect to the surface of a cutting material, an assist-gas output, and the distance between the surface of the cut material and the front end of a laser-beam nozzle, and also depend on material's conditions such as a kind, a surface state, quality, composition, and the thickness of the material. Especially among those, a beam intensity distribution of the laser beam largely governs the machining capabilities; thus, it is important to effectively irradiate the beam onto the cutting material surface.

For dealing therewith, in order to effectively irradiate a beam onto a cutting material surface in a conventional laser machining nozzle, the laser beam emitted from a laser oscillator is reflected on the interior surfaces of the laser machining nozzle. Onto the interior surfaces of the laser machining nozzle, plating of a highly reflective material such as gold plating is applied. A beam intensity of the laser beam is made uniform according to this configuration, and the diameter of the intensity-uniformed laser beam thus obtained is slightly enlarged to a desired diameter to provide a laser beam configured to have a cylindrical energy distribution, by which the cutting material surface is irradiated to proceed laser cutting (for example, refer to Patent Document 1).
[Patent Document 1] Japanese Laid-Open Patent Publication No. H10-249572

DISCLOSURE OF THE INVENTION

[Problems to be Solved by the Invention]

In a configuration of a conventional laser machining nozzle, based on the premise that a laser beam is reflected thereinside, a reflectance is increased by applying gold plating onto the reflection surface, thereby the absorptance of the laser beam to the laser machining nozzle is curbed. However, only increasing the reflectance is not sufficient to curb a temperature rise of the laser machining nozzle, causing a problem in that peeling of the gold plating or the like occurs.

In addition, in the configuration of a conventional laser machining nozzle, simultaneously with the laser beam irradiation an assist-gas is flowed through the same path so as to remove molten metal. According to this configuration, a cooling effect of the laser machining nozzle may be come up with; however, it cannot be said that the effect is sufficient for addressing the problem with regard to peeling of the gold plating.

The present invention has been directed at solving those problems described above, and an object of the invention is to obtain a laser machining nozzle that prevents a temperature rise of the laser machining nozzle even when a laser beam is caused reflected on an interior surface of the laser machining nozzle, and of preventing peeling of a plating with a highly reflective material applied onto the interior surface of the laser machining nozzle.

[Means for Solving the Problems]

A laser machining nozzle according to the present invention comprises a main assist-gas nozzle for emitting a laser beam and a main assist-gas therefrom, and an auxiliary assist-gas nozzle annularly surrounding the main assist-gas nozzle for emitting an auxiliary assist-gas, wherein a plating of a reflective material is provided on an interior surface of the main assist-gas nozzle so as to reflect the laser beam.

[Effects of the Invention]

According to the nozzle in the present invention, a main assist-gas nozzle provided on its interior surface with a plating of a reflective material for reflecting the laser beam, and an auxiliary assist-gas nozzle annularly surrounding the main assist-gas nozzle are included, whereby assist-gases can be flowed along the inner side of and along the outer side of a front end portion of the main assist-gas nozzle, and even when the laser beam is reflected on the interior surface of the main assist-gas nozzle, a temperature rise of the main assist-gas nozzle can be curbed. For this reason, it is possible to reduce peeling of the plating on the interior surface of the main assist-gas nozzle.

BRIEF DESCRIPTION OF DRAWINGS

FIG. 1 is a longitudinally schematic section-diagram illustrating a laser machining nozzle in Embodiment 1 of the present invention;

FIG. 2 is a graph showing a temperature rise of the laser machining nozzle in Embodiment 1 of the present invention.

BEST MODE FOR CARRYING OUT THE INVENTION

Embodiment 1

Figure 3:
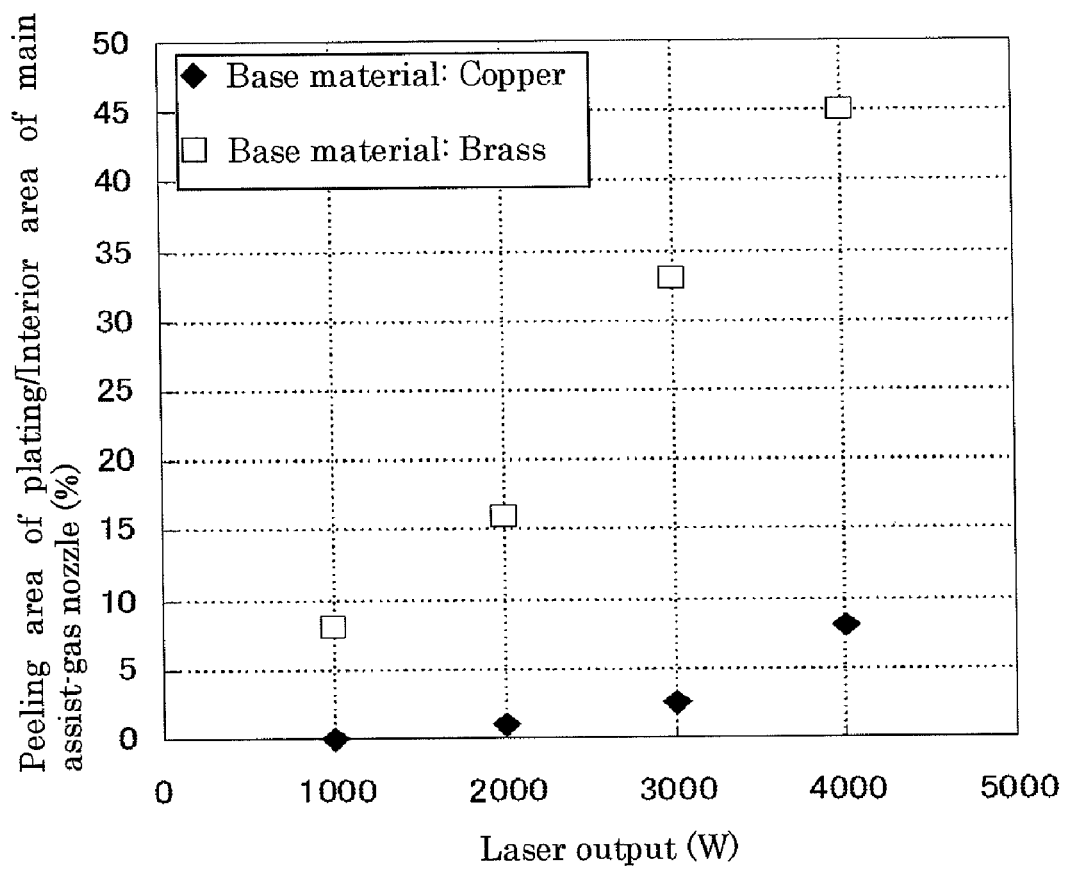
FIG. 3 is a graph showing a peeling ratio of plating on a laser machining nozzle when performing laser beam irradiation in Embodiment 2 of the present invention.

FIG. 1 is a section-diagram illustrating a shape of a laser machining nozzle in Embodiment 1 for carrying out the present invention. FIG. 1 (*a*) is a diagram in which assist-gas's flows are added to the nozzle section-diagram, and FIG. 1 (*b*), a diagram in which a laser beam and a workpiece are added to the nozzle section-diagram. As shown in FIG. 1, the laser machining nozzle 1 has a double nozzle structure including a main assist-gas nozzle 2 in the middle portion and an auxiliary assist-gas nozzle 5 in the circumferential portion.

The main assist-gas nozzle 2 is constituted of a main assist-gas nozzle jet-outlet 3 placed in the innermost portion with its internal diameter D1, and a main assist-gas duct 4 connected to the jet-outlet, as shown in FIG. 1. And, the laser beam 8 emitted from a laser oscillator not shown in the figure and a main assist-gas 10 supplied from an assist-gas supplying unit not shown in the figure pass through inside the nozzle, and then the laser beam 8 and the main assist-gas 10 are emitted from the main assist-gas nozzle jet-outlet 3. In addition, onto the interior surface of the main assist-gas nozzle 2, approximately 0.1 μm thick gold plating 12 is uniformly applied using a non-electrolytic plating method.

The auxiliary assist-gas nozzle 5 is configured circumferentially to the main assist-gas nozzle 2, as shown in FIG. 1, including an auxiliary assist-gas nozzle jet-outlet 6 that is in an annular shape with its internal diameter D2, and auxiliary assist-gas supply opening(s) 7 spatially connected to the jet-outlet. Here, it is sufficient that D2≧D1, and in the case of FIG. 1 is set D2>D1. Thus, an auxiliary assist-gas 11 supplied from the assist-gas supplying unit not shown in the figure is passed inside the nozzle by way of the auxiliary assist-gas supply opening(s) 7, and is emitted from the auxiliary assist-gas nozzle jet-outlet 6.

Moreover, the jet-outlet 3 of the main assist-gas nozzle 2 is placed upstream of the jet-outlet 6 of the auxiliary assist-gas nozzle 5 in the assist-gas's flows 10 and 11. According to this arrangement, assist-gas pressure and assist-gas flow velocity continuously change under the jet-outlets, and values of the pressure fluctuation and the flow velocity fluctuation of the main assist-gas's flow 10 become large, making it possible to enhance the machining quality.

Next, the operations of the laser machining nozzle according to this embodiment will be explained.

Together with the main assist-gas 10, the laser beam 8 passes through the main assist-gas duct 4 that is a supply path for the main assist-gas nozzle 2, and then passes through the main assist-gas nozzle jet-outlet 3 followed by the auxiliary assist-gas nozzle jet-outlet 6 so as to irradiate the workpiece 9. In addition, the main assist-gas 10 and the auxiliary assist-gas 11 are emitted from the auxiliary assist-gas nozzle jet-outlet 6 as shown in FIG. 1, and are supplied onto a cutting surface of the workpiece 9. Here, the assist gases may be, for example, a nitrogen gas. Subsequently, by directing the laser beam 8 onto a portion of the gold plating 12 on the interior surface of the main assist-gas nozzle 2, a beam intensity distribution of the laser beam 8 is optimized, and high quality machining is realized. In this occasion, because the main assist-gas nozzle 2 is cooled through its interior surface by the main assist-gas 10 and cooled through its exterior surface by the auxiliary assist-gas 11, a temperature rise of the main assist-gas nozzle 2 due to interference by the laser beam 8 can be curbed, so that it becomes possible to reduce peeling of the gold plating 12 or the like.

However, although a double structure nozzle has been conventionally used as a laser machining nozzle, the purposes are to arrange a flow velocity of the main assist-gas and a position of the main assist-gas nozzle at the optimum condition for machining, and at the same time to completely shield a part under machining so as not to involve the atmosphere thereinto, whereby high speed and high quality machining is stably performed. Namely, such a double structure nozzle has been used just only for enhancing machining quality, and is not used for cooling the nozzle at all; and it is the first time that the inventors have found that peeling of the gold plating on an internal nozzle is reduced in a double structure nozzle.

Next, the measurement results on a reduction effect of peeling of the gold plating according to this embodiment will be explained. The measurement conditions are described as follows.

The internal diameter D1 of the main assist-gas nozzle 2 is 1.5 mm, and the internal diameter D2 of the auxiliary assist-gas nozzle 5 is 4 mm. A laser oscillator is a carbon-dioxide gas laser oscillator, and its laser output is set at 4000 W. The jet-outlet 3 of the main assist-gas nozzle is placed upstream of the jet-outlet 6 of the auxiliary assist-gas nozzle by 5 mm in the assist-gas's flows, and the assist-gas pressure is set at 1.5 MPa.

In addition, as a method of directing the laser beam 8 onto the gold plating 12, multiple reflections such as those in conventional technologies may be used; however, because there is also an experimental result in which machining quality is enhanced to a large extent when a beam intensity distribution is adjusted by interfering the perimeter portion of the laser beam 8 with the gold plating 12, it is so arranged in this measurement that only the perimeter portion of the laser beam 8 is directed onto the gold plating 12. Here, in order to direct the perimeter portion of the laser beam 8 onto the gold plating 12, the focusing position of the laser beam is changed; in this embodiment, the focusing position of the laser beam 8 is thus set at 8 mm from the front end of the laser machining nozzle.

Under the measurement conditions described above, measured results of a laser beam irradiation time and a nozzle temperature rise are shown in FIG. 2. In FIG. 2, the symbol "♦" indicates values in which both a main assist-gas and an auxiliary assist-gas are not supplied; the symbol "□," values in which an auxiliary assist-gas is not supplied and only a main assist-gas is supplied; and the symbol "▲," values in this embodiment in which both a main assist-gas and an auxiliary assist-gas are supplied.

In FIG. 2, by comparing values of the symbol "♦" with those of the symbol "▲," it can be found that, in the laser machining head in the embodiment in which there exists an auxiliary assist-gas's flow on the outer side of the main assist-gas nozzle, the saturation temperature of the nozzle is curbed by approximately 90% in comparison with the case in which there exists no assist-gas. Moreover, by comparing values of the symbol "□" with those of the symbol "▲," it is found that the saturation temperature is also curbed by the degree of approximately 70% when compared with the case in which there only exists the main assist-gas, thereby revealing that the laser machining nozzle according to the embodiment has a larger cooling effect.

In the laser machining nozzle in this embodiment, because cooling of the main assist-gas nozzle, that is under temperature rise due to reflections of the laser beam on the interior gold plating surface of the nozzle, is performed by the main assist-gas and the auxiliary assist-gas, it is possible to reduce a temperature rise of the laser machining nozzle. Accordingly, it is possible to reduce peeling of the gold plating provided on the interior surface of the main assist-gas nozzle.

Note that, the explanation has been made for a double structure nozzle in this embodiment; however, it may be a multiple structure nozzle having threefold or more structures so long as an assist-gas flows along the outer side of the main assist-gas nozzle. In addition, although the explanation has been made for the assist-gas as a nitrogen one, its kind is not particularly limited to that; it may be selected suitably for machining conditions. Moreover, a material for the gold plating on the main assist-gas nozzle is not necessarily limited to gold; namely, a highly reflective material that can efficiently reflect a laser beam may be used.

Embodiment 2

By the way, brass has been used as a material for a conventional laser machining nozzle. This is because, in a case of the brass, cutting performance is good, whereby machining costs and machining time for the nozzle itself can be reduced. Also in Embodiment 1, brass is used as the material forming the main assist-gas nozzle similarly to a conventional one; however, in this embodiment, a gold plating is applied to a main assist-gas nozzle using copper as its material. This is to reduce the peeling and/or melting phenomenon of the gold plating from being accelerated resulting from the use of brass or like material whose thermal conductivity is small; because such material shows a small thermal diffusion in contrast with a temperature rise produced by the absorption of laser light, so that the temperature of the laser machining nozzle is likely to rise. Namely, an object in the embodiment is to further reduce peeling and/or melting of the gold plating by applying a gold plating to the copper that has a large thermal conductivity, thereby providing a larger thermal diffusibility.

Because a configuration of the laser machining nozzle in this embodiment is the same as that in FIG. 1 of Embodiment 1 except that the material forming the main assist-gas nozzle is copper, the explanation for the configuration and the operations is omitted.

Next, measurement has been performed on effects due to material change of the laser machining nozzle from brass to copper. The measurement conditions are set similar to those in FIG. 2 in Embodiment 1, and a nozzle made of brass and a nozzle made of copper are prepared for the measurement of the degree of peeling of the gold plating under the same conditions. Here, as for the copper, pure copper C1100 is used.

FIG. 3 indicates the results in which an output of a laser beam and a peeling ratio of gold plating on the laser machining nozzle have been measured. The irradiation time of the laser beam is set at 600 seconds. Here, the peeling ratio represents the ratio of a peeling area of the gold plating with respect to an interior area of the main assist-gas nozzle (area to which gold plating is applied in FIG. 1). As shown in FIG. 3, when an output of the laser beam is 4000 W, the reduction by approximately 80% in the peeling ratio is possible to be realized in the case of using copper as the material forming the main assist-gas nozzle as in this embodiment, in comparison with the case of using conventional brass as the material.

The laser machining nozzle in this embodiment utilizes copper having a high thermal conductivity as a base material forming the main assist-gas nozzle, and a gold plating is applied thereto, so that it is possible to further reduce peeling and/or melting of the gold plating in comparison with the laser machining nozzle in Embodiment 1. Accordingly, stable machining can be performed over a long period of time.

Note that, while copper used for the main assist-gas nozzle in the laser machining nozzle has a thermal conductivity value of 354 $W \cdot m^{-1} \cdot K^{-1}$ at 700° C., the main assist-gas nozzle may be made of another material having a thermal conductivity value equal to or more than that of copper, and thus the material therefor is not specifically limited.

INDUSTRIAL APPLICABILITY

The laser machining nozzle according to the present invention is used for a laser machining nozzle included in a laser machining apparatus for emitting a laser beam.

What is claimed is:

1. A laser machining nozzle, comprising:
    a main assist-gas nozzle having a jet-outlet for emitting a laser beam and a main assist-gas therefrom, the main assist-gas nozzle including a plating of a reflective material provided on an interior surface of the nozzle for reflecting the laser beam; and
    means for cooling the main assist-gas nozzle comprising an auxiliary assist-gas nozzle for emitting an auxiliary assist-gas from an annular jet-outlet thereof provided in a circumference portion of the main assist-gas nozzle.

2. The laser machining nozzle as set forth in claim 1, wherein the plating on the interior surface of the main assist-gas nozzle is gold plating.

3. The laser machining nozzle as set forth in claim 1, wherein thermal conductivity of a material forming the main assist-gas nozzle is equal to or more than that of copper.

4. The laser machining nozzle as set forth in claim 3, wherein the material forming the main assist-gas nozzle is copper.

5. The laser machining nozzle as set forth in claim 1, wherein the jet-outlet of the main assist-gas nozzle is placed upstream of the jet-outlet of the auxiliary assist-gas nozzle in a flow of the auxiliary assist-gas.

6. The laser machining nozzle as set forth in claim 1, wherein the cooling means further comprises an additional auxiliary assist-gas nozzle which emits the auxiliary assist-gas from an annular jet-outlet thereof provided in a circumference portion of the auxiliary assist-gas nozzle.

7. The laser machining nozzle as set forth in claim 4, wherein the material forming the auxiliary assist-gas nozzle is brass.

8. The laser machining nozzle as set forth in claim 4, wherein the gold plating is applied to the copper of the main assist-gas nozzle.

9. The laser machining nozzle as set forth in claim 7, wherein the material forming the auxiliary assist-gas nozzle is brass.

* * * * *